2,809,191

CELLULOSE ESTERS AND MIXED ESTERS IN THE FORM OF SMALL, DENSE, SPHERICAL PARTICLES

Arthur W. Sloan, Washington, D. C., and David J. Mann, Wharton, N. J., assignors to Atlantic Research Corporation, Alexandria, Va., a corporation of Virginia No Drawing. Application May 25, 1954,
Serial No. 432,321

13 Claims. (Cl. 260—230)

This invention relates to new and improved cellulose acetate and other lower fatty acid esters of cellulose in the form of small, dense, spherical particles.

The fatty acid esters of cellulose such as cellulose acetate have hitherto been produced in the form of particles which are porous and/or relatively large and irregularly shaped. These characteristics make it impossible to suspend the particles in a plasticizer to form a fluid, pourable, homogeneous slurry. The large particles sediment rapidly and the porous particles are quickly infiltrated by the plasticizer to form wet powders. Non-spherical particles, regardless of density, cannot be introduced into a plasticizer in any substantial quantities without loss of fluidity.

For these reasons, it has hitherto been the practice to mix the cellulose ester with plasticizer in a kneader or masticating mill to form a stiff paste and then to extrude it under heat and pressure into the desired shape or to introduce the paste into a mold and subject the material to heat and pressure. To prepare more fluid mixes, as, for example, for making coatings or films, it has been necessary to introduce considerable amounts of a volatile solvent or to form aqueous emulsions of the material. Since the volatile solvent and water must be removed, such a procedure is feasible for use only in the manufacture of thin films. Removal of the solvent also causes shrinkage of the film which in many cases is undesirable.

The object of this invention is to provide small, spherical, non-porous particles of cellulose acetate and other fatty acid cellulose esters.

Other objects and advantages of our invention will become obvious from the following detailed description.

Processes for making the small, non-porous, spherical particles of cellulose acetate and other lower fatty acid esters are described and claimed in Sloan and Mann patent application filed concurrently herewith.

Broadly, the process as described in said Sloan and Mann application comprises dissolving the fatty acid cellulose ester in a suitable organic solvent, dispersing the resulting lacquer with vigorous agitation in water containing a suitable protective colloid and a suitable, water-soluble salt to form an oil-in-water type emulsion and then removing the organic solvent from the dispersed cellulose ester particles. It is preferable, though not essential, to employ a surface-active emulsifying agent in addition to the colloiding agent.

The cellulose ester is preferably a lower fatty acid ester such as the acetate, propionate, butyrate and the like. The acylating groups may be the same or mixed. In general, cellulose acetate or a mixed cellulose acetate ester containing other lower fatty acid groups, such as cellulose acetate propionate, cellulose acetate butyrate, cellulose acetate sorbate and the like, are preferred.

To obtain particles of the desired size, sphericity and density, the reagents and conditions of the process must be carefully controlled.

The organic cellulose ester solvent should comprise a co-solvent mixture, one component of which should be insoluble to moderately soluble in water and another component of which must be infinitely soluble in water or, in other words, soluble in water in all proportions. It is not essential that each of the solvent components be a good solvent for the cellulose ester so long as they possess good solvent properties when in admixture. Ethyl acetate, methanol and ethanol are individually poor solvents for cellulose acetate. However, mixtures of ethyl acetate with either of the alcohols possess excellent solvent properties. By "moderately soluble" is meant a solvent which is soluble to the extent of about 5 to 30 parts in 100 parts of water at 20° C. In general, we prefer to employ a moderately soluble solvent with the infinitely soluble co-solvent rather than one which is substantially insoluble in water.

The cellulose ester mixed solvent must be soluble to the extent of at least about 10 parts and no more than about 50 parts, and preferably about 15 to 40 parts, in 100 parts of water at 20° C. Thus the amount of infinitely soluble co-solvent employed must be such as to adjust water-solubility of the mixed solvent within the desired range. This is important with regard to producing particles possessing the desired size, shape and density.

Insoluble to moderately soluble solvent components which may be employed include methyl acetate, ethyl acetate, methyl formate, ethyl formate, methyl ethyl ketone, nitromethane, chloroform, methylene chloride, ethylene chloride and the like. As aforementioned, the substantially insoluble solvents such as chloroform, methylene chloride and ethylene dichloride, are, in general, least desirable since particle sizes tend to be close to or at the upper limit of desirability and these solvents tend to dissolve the more desirable protective colloids, particularly at the elevated temperatures of distillation.

The infinitely soluble co-solvent appears to be essential for the production of particles of the desired sphericity, particle size and non-porosity. This is, apparently, in part due to its effect in reducing viscosity of the lacquer, thus increasing ease of comminution, and the fact that upon dispersal in water it leaches out quite rapidly, thus reducing surface tackiness and setting or hardening the surface of the particles sufficiently to minimize the tendency of the particles to coalesce. The less soluble solvent component continues to provide adequate plasticity to ensure sphericity and non-porosity. Examples of water soluble co-solvents include the lower aliphatic alcohols, such as methyl, ethyl and propyl alcohols, acetone, ethyl lactate, dioxan-1,4 and the like, alcohols being preferred because of their highly effective viscosity reducing properties.

Choice of the particular solvent system will vary to some extent according to the particular cellulose ester employed, the particular colloid used and the method of removing solvent. For most of the cellulose esters, co-solvent mixtures comprising methyl or ethyl acetate in combination with methanol, ethanol or acetone, preferably the alcohols, are very satisfactory although other combinations may also be used.

The protective colloid must not be excessively soluble in the cellulose ester solvent since, otherwise, the system would tend to form a water-in-oil type emulsion. This situation can be handled by employing a protective colloid which is not highly soluble in the specific solvent or by avoiding the use of solvents which tend to dissolve the particular colloid out of the water phase.

Choice of solvent is also to some extent determined by the method of removal used. If removal is by distillation, it is desirable that the solvent have a relatively low boiling point, preferably less than 100° C. If elution is employed, the less soluble solvent component should be moderately soluble in water.

Optimum ratio of the infinitely soluble co-solvent to the insoluble to moderately soluble component will vary to some extent depending upon the specific cellulose ester, the particular solvents employed and the specific colloiding agent, and can readily be determined by the skilled practitioner.

The amount of solvent employed in dissolving the cellulose ester is in some degree determined by the particular cellulose ester and solvent employed. Lacquer solutions comprising about 5 to 20% cellulose ester and preferably about 10 to 15% are generally most satisfactory. Solutions comprising less than about 5% may be used but tend to be uneconomical because of the large amount of solvent required. Lacquer solutions comprising more than about 20% cellulose ester are generally excessively viscous and are, therefore, very difficult to disperse in water to form spherical particles of the desired small particle size.

The dispersion of the lacquer in the water is accomplished by means of vigorous agitation in any desired manner, as, for example, in a homogenizer or other suitable agitating device. The colloiding agent and the salt should be dissolved in the water prior to addition of the lacquer. The non-colloiding, surface-active emulsifying agent may be incorporated in the lacquer or dissolved in the water.

Particle size is a function of the lacquer/water ratio in as much as increasing the amount of water results in an increase in particle size. Thus the quantity of water used in emulsification is determined in large measure by the particle size desired. The minimum amount of water is governed by the lacquer/water ratio required to permit formation of the requisite oil-in-water system rather than a water-in-oil emulsion. The optimum amount of water varies to some extent with the particular organic solvents used. In general, amounts ranging from about 50 to 125% by volume, and preferably about 50 to 75%, based on the volume of organic solvent gives highly satisfactory results.

The colloiding agent is desirably a high molecular weight polymer or co-polymer which is preferentially soluble in water rather than in the organic solvent and which increases the viscosity of the water phase to a considerable extent. A colloiding material which is excessively lipophilic should be avoided since the emulsion would tend to form a water-in-oil system. A colloid which is normally hydrophilic may show an excessive affinity for a particular organic solvent and, as aforementioned, a different solvent or another colloiding agent must be employed. Examples of colloiding agents which we have found suitable include methyl cellulose, the condensation product of polyvinyl methyl ether and maleic anhydride, carboxymethyl cellulose, polyvinyl alcohol, casein, gelatine, gum arabic, gum tragacanth and the like. Of these methyl cellulose and polyvinyl methyl ether-maleic anhydride are preferred. Efficacy of any given colloiding agent varies to some degree according to the particular cellulose ester solvent used.

The colloiding agent forms a colloidal solution with the water, thus increasing the viscosity of the water phase, and also surrounds the lacquer particles with a protective coating. These factors stabilize the emulsion by reducing tendency of the particles to coalesce, particularly during stripping of the solvent. This is important since the particles must be maintained in a state of dispersion until surface tackiness has been substantially eliminated and hardening has progressed to the point where the particles will not longer agglomerate.

The amount of colloiding agent employed is determined by several factors. Primarily, it should be sufficient to produce substantial increase in the viscosity of the water phase and to coat the particles, thus providing adequate stabilization of the emulsion during processing. Generally speaking, the higher the molecular weight of the colloid, the less will be required. The colloid is also a factor in controlling particle size since increasing concentration tends to reduce particle size. There is no critical upper limit to the amount of colloid employed other than practical considerations such as desired particle size and ease of washing. The more colloid present, the more washing is required for its removal.

It is desirable, though not essential, to incorporate a polar-type, surface-active emulsifying agent which produces a marked lowering of interfacial tension and which, unlike the higher molecular weight colloiding agent, does not produce a substantial increase in the viscosity of the water phase. The inclusion of the surface-active emulsifying agent appears to be advantageous in several ways. It reduces considerably the amount of energy and time required to disperse the lacquer in the water and contributes to the production of smaller particles within the desired range of particle size. The more rapid the dispersion of the lacquer, the less is the likelihood that the organic solvent will elute from the surface of the particles into the water and cause hardening to the point where further comminution to the desired size and contraction to sphericity becomes impossible. The emulsifying agent also reduces the amount of colloiding agent required to form a stable emulsion and thus facilitates subsequent removal of the colloid from the particles.

Any suitable surface-active emulsifying agent may be employed which is compatible with the other components of the system and which is substantially soluble in water, namely possesses a sufficiently high hydrophile-lipophile balance to prevent its being drawn into the organic solvent and converting the emulsion into a water-in-oil system, such as alkyl sulfates or sulfonates, alkylaryl sulfonates, alkali metal soaps, alkali metal salts of perfluoro acids, alkali metal salts of sulfosuccinic acids, sulfonated oils including sulfonated vegetable oils and sulfonated hydrocarbon oils, polyglycols and the like. The moderately active types of emulsifying agents such as the sulfonated vegetable oils as, for example, sulfonated castor oil, sulfonated coconut oil and the like, sulfonated hydrocarbon oils as, for example, sulfonated petroleum fractions, alkali metal fatty acid soaps, polyglycols such as polyethylene glycol and polypropylene glycol, and the like, are especially satisfactory. The polyglycols, in addition to their dispersing action, also may be advantageous as coupling agents, namely as agents which increase solubility of the colloid or the organic solvent in water.

The amount of surface-active emulsifier is not critical but should be sufficient to promote the desired rapid emulsification and comminution of the particles. As little as about 0.01 to 0.25% based on the water phase may be adequate. The amount may be increased to as much as 5 to 10% in some cases. Concentrations of emulsifier in the range of about 0.01 to 2% are generally satisfactory.

It is essential that a suitable water-soluble salt be included in the emulsion system. It is apparently necessary for the proper functioning of the protective colloid. Without the addition of the salt, the particles formed are non-spherical and oversize. The salt prevents the inversion of phase which frequently occurs when the emulsion is heated to distillation temperature to remove the organic solvent. It may be, also, that the salt exerts a stabilizing effect by causing hydration of the colloid and thus preventing undue penetration of the colloid into the lacquer particle, and by inducing a charge on the surface of the colloid-enveloped particle which tends to prevent agglomeration.

Any suitable, water-soluble salt which is compatible with the colloiding agent, namely one which will not cause it to precipitate, may be employed, as, for example, the metal or ammonium halides, sulfates, acetates and the like. Choice of the particular salt employed is, in some measure, determined by the particular colloid used in the emulsion system. Some colloids, such as methyl cellulose, function only with a monovalent salt, such as the alkali metal and ammonium halides. By monovalent salt is meant one in which both the cation and anion are monovalent. A divalent salt, such as sodium sulfate, may be used with polyvinyl methyl ether-maleic anhydride but the monovalent salt is preferable. By divalent salt is meant one in which at least one ion is divalent, preferably the anion. Proteinaceous colloids such as casein and gelatine and pentosans such as gum arabic and gum tragacanth tolerate both monovalent and divalent salts. In general, the alkali metal salts are preferred.

The salt must be employed in an amount less than that which will cause precipitation of the colloid or a "salting out" effect. In general, the lower the molecular weight of the colloid, the greater the amount of salt which it will tolerate. Degree of salt toleration also varies with the particular salt.

We have found that below certain minimum salt concentrations the salt is not effective since the resulting particles tend to be oversize and non-spherical. This minimum amount varies with the particular salt. In general, the minimum concentration for the monovalent salts is about 10% based on the weight of the cellulose ester and for divalent salts, such as sodium sulfate, about 25%.

After emulsification is completed the organic mixed solvent is removed from the dispersed particles by distillation or by elution. In either case, the emulsion should be maintained in a state of continuous, vigorous agitation.

Distillation is accomplished by heating the emulsion to or near to the boiling point of the organic mixed solvent. Preferably, the least volatile solvent component has a boiling point below 100° C. to prevent breaking of the heat-sensitive emulsion and to avoid substantial vaporization of the water which might cause an increase in effective concentration of the salt to the point of premature precipitation of the colloid.

Another effective method for removing the organic mixed solvent is by diluting the emulsion with water in amount sufficient completely to dissolve the solvent out of the cellulose ester particles. Since it is desirable to maintain the effective salt concentration throughout the disperse phase of the particles, it is preferable to dissolve salt in the elution water prior to dilution of the emulsion. The total amount of water should be in excess of the theoretical amount required for solution of the organic solvent, preferably in substantial excess. It is, of course, essential for the success of this method that the less soluble component of the solvent mixture be moderately soluble in water.

After removal of the organic solvent, the cellulose ester particles are separated from the water, washed with water and dried. Removal of the colloid may require several washings. In general, the smaller the particles, the more water washings are required.

We have found that methyl cellulose is particularly advantageous for use as the colloiding agent in our process, both with regard to superiority of product characteristics and uniformity of reproduction. A detailed description of the process employing methyl cellulose as the colloiding agent follows. Cellulose acetate is employed as the preferred embodiment. However, it will be understood that other lower fatty acid esters of cellulose, including mixed esters may be substituted for the cellulose acetate.

The methyl cellulose is preferably of the higher molecular weight variety, namely one having a minimum centipoise value of about 400 and preferably about 1500 to 4000 or higher.

The preferred solvent for the cellulose acetate is methyl acetate in admixture with methanol, ethanol or acetone, preferably the alcohols. Methyl formate, ethyl formate or methyl ethyl ketone in combination with methanol, ethanol or acetone also functions satisfactorily as a solvent system. The methyl cellulose is somewhat too soluble in ethyl acetate to permit effective use of this solvent. At the elevated temperatures of distillation the methyl cellulose also tends to dissolve excessively in chlorinated solvents.

The ratio of methyl acetate to the alcohol, such as methanol, is preferably in the range of about 78 to 96% by volume for the methyl acetate to 22 to 4% for the methanol. The higher the molecular weight of the methyl cellulose, the smaller, desirably, is the ratio of methyl acetate to alcohol within the given range. With methyl cellulose of 4000 cps., for example, the ratio of methyl acetate to methanol is preferably about 78–86%:22–14%. In the case of 1500 cps. methyl cellulose, satisfactory results are obtained with amounts of methyl acetate up to about 96% although the maximum amount of methyl acetate is preferably about 86 to 92%. The methyl acetate/methanol azeotrope (82:18) is very satisfactory with both lower and higher molecular weight methyl cellulose and possesses the additional advantage of commercial availability. The preferred ratio of the solvent components where ethanol or acetone is used falls substantially within the range given for methanol. In general, with methyl acetate ratios below about 78%, the cellulose acetate particles tend to form irregular platelets of fused particles. When the methyl acetate concentration becomes excessive, the particles again tend to become irregular and oversize and the emulsion lacks stability apparently because the methyl cellulose tends to dissolve unduly in the organic solvent and also becomes more prone to precipitation by the salt.

The cellulose acetate concentration in the organic solvent is desirably in the range of about 5 to 20% and preferably about 10 to 15%. Below about 5%, the large amount of solvent required tends to make costs excessive without accompanying increase in product quality. Above about 20%, the lacquer is generally too viscous for successful emulsification.

The amount of water employed for the aqueous phase of the emulsion is desirably about 50 to 125% by volume based on the quantity of organic solvent, and preferably about 50 to 75%.

We have found the minimum effective concentration of the methyl cellulose to be about 2%, preferably about 4%, by weight based on the cellulose acetate. Below this concentration the particles tend to be oversize and irregular and the emulsion somewhat unstable. The amount of methyl cellulose is desirably increased with decreasing molecular weight of the colloid. For example, while good results are obtained with a minimum of about 2.5 to 4% of 4000 cps. methyl cellulose, it is somewhat more satisfactory to employ about 4%, preferably about 7%, of 1500 cps. methyl cellulose.

Particle size is a function of methyl cellulose concentration. The higher the concentration of the colloid, the smaller is the average resulting particle size. There is no critical upper limit to the amount of colloid used except, as aforementioned, for such practical considerations as desired minimum average particle size, ease of colloid removal and cost. Amounts of 4000 cps. methyl cellulose exceeding about 10 to 15% on the cellulose acetate and amounts of 1500 cps. methyl cellulose exceeding about 20 to 30% generally result in average particle sizes of about 1 to 2 microns or less.

As aforementioned, the colloid does not function effectively unless a suitable water soluble salt is present. In the absence of such a salt the particles formed are irregular and oversize. It is essential, therefore, that a suitable salt in adequate concentration be included in the system. In the case of methyl cellulose, the salt must be monovalent. Most satisfactory results are obtained with the alkali metal and ammonium halides, preferably the chlorides, such as sodium chloride.

Unless the salt is employed in adequate amount the particles tend to be irregular in shape. The effective minimum is about 10% based on the cellulose acetate. The upper limit of salt concentration is set by its "salting out" effect on the colloid. If amounts exceeding this limit are incorporated, the colloid tends to dehydrate and precipitate out and the particles become irregular and oversize. The amount of salt which will cause colloid precipitation is determined by several factors. The higher the molecular weight of the colloid, the more sensitive it is to increased salt concentration. Increasing methyl acetate concentration also tends to increase colloid sensitivity. Thus 4000 cps. methyl cellulose at 86% methyl acetate concentration in the co-solvent mixture generally tolerates a maximum sodium chloride concentration of about 13 to 20% based on the cellulose acetate whereas at lower methyl acetate concentrations, it will tolerate up to about 20 to 30% NaCl. Lower molecular weight methyl cellulose is less sensitive to the salt and higher concentrations of salt may be safely employed, although, in general, salt concentrations similar to those employed with the higher molecular weight methyl cellulose give excellent performance.

Although not essential, it is desirable to incorporate a polar-type, surface-active emulsifying agent into the emulsion system. The moderately active agents such as sulfonated oils as, for example, sulfonated vegetable oils and sulfonated petroleum oils, the alkali metal fatty acid soaps and polyglycols, are especially satisfactory. The amount of surface-active emulsifying agent does not appear to be critical. In general as little as 0.01 to 0.025% on the water is effective and amounts as high as 5 to 10% may be employed without adverse effect. Increasing the amount above these levels does not appear to provide any increased advantage. Amounts up to about 1 to 2% are generally entirely adequate.

Another colloiding agent which we have found very satisfactory is the condensation product of polyvinyl methyl ether and maleic anhydride. This colloiding agent functions very similarly to the methyl cellulose. A preferred cellulose ester solvent for use with polyvinyl methyl ether-maleic anhydride is a mixture of ethyl acetate and ethanol in the ratio of about 82–88 parts ethyl acetate to 18–12 parts ethanol, preferably about 85 parts ethyl acetate to about 15 parts ethanol. Satisfactory results can also be obtained with other solvent mixtures such as methyl acetate, methyl formate or ethyl formate plus methanol, ethanol or acetone. The salt is preferably of the monovalent type such as the alkali metal and ammonium halides, e. g. NaCl. A divalent salt such as sodium sulfate may also be used. As in the case of methyl cellulose, a polar-type, surface-active emulsifying agent is not essential but is desirable. The moderately active agents are somewhat preferable, although the highly active surface-active materials may also be used. Agents which tend to increase the solubility of the colloid or lacquer in water, such as the polyglycols, are frequently advantageous.

As aforementioned, other colloiding agents such as casein, gelatine, pentosans such as gum tragacanth and gum arabic, carboxymethyl cellulose, polyvinyl alcohol and the like can also be used. However, they are less desirable than methyl cellulose or polyvinyl methyl ether-maleic anhydride since, in general, particle size tends to approach the upper limits of the desired range. Processing is, in general, similar to that for methyl cellulose. These colloiding agents are somewhat more tolerant of chlorinated solvents such as chloroform, methylene chloride and ethylene dichloride, than methyl cellulose. The preferred range of chlorinated solvent to methanol or ethanol is about 80–90 parts chlorinated solvent to 20–10 parts alcohol. Either monovalent or divalent salts may be used with these colloiding agents.

*Example I*

30 grams of cellulose acetate (acetyl value 37.2–37.8) were mixed with 200 ml. methyl acetate/methanol azeotrope (82:18) in a homogenizer until the lacquer was clear. A methyl cellulose (4000 cps.) solution was prepared by mixing 1.2 grams of the colloid with 125 ml. of boiling water and then cooling to 5–10° C. until the solution was clear. 1.6 grams of Turkey red oil (75% sulfonated castor oil) was then added to the methyl cellulose solution. The methyl cellulose solution was added to the cellulose acetate lacquer under vigorous agitation in the homogenizer. 4 grams of NaCl dissolved in 25 ml. water were added immediately after the methyl cellulose solution. The emulsion was agitated vigorously for about 5 minutes and heated up to a temperature of about 75° C. to distill off the methyl acetate/methanol solvent from the dispersed spherical particles. Vigorous agitation was maintained during distillation. The product was washed with water three times, filtered, washed again with water on the filter and dried. The product was in the form of spherical particles ranging in size from about 1 to 10 microns and having a density of 1.366 to 1.368.

*Example II*

A product similar to that prepared according to Example I was made by a similar process except that the methyl acetate/methanol solvent was removed by flooding the emulsion with about 4 volumes of water containing sufficient salt to maintain the saline concentration. Vigorous agitation was continued during elution of the solvent.

Other examples illustrating our invention are summarized in Table I. Except where otherwise characterized, the particles produced were spherical.

TABLE I

| Cellulose ester, grams | Solvent, ml. | Colloid, grams | Surface-active agent, grams | Salt, grams | Water, ml. | Particle size, microns |
|---|---|---|---|---|---|---|
| Cellulose acetate, 30 | Methyl acetate 82%; Methanol 18%, 200. | Methyl cellulose, 4,000 cps., 1.2. | Turkey red oil (75%), 1.6. | NaCl, 3 | 150 | 1. |
| Do | do | Methyl cellulose, 4,000 cps., 0.9. | do | do | 150 | 1–10. |
| Do | do | Methyl cellulose, 4,000 cps., 0.8. | do | do | 150 | 2–20. |
| Do | do | Methyl cellulose, 4,000 cps., 0.6. | do | do | 150 | 1–25. |
| Do | Methyl acetate 78%; Methanol 22%, 200. | Methyl cellulose, 4,000 cps., 2.1. | do | NaCl, 4 | 150 | 1–5. |
| Do | do | do | do | NaCl, 5 | 150 | 1–12. |
| Do | Methyl acetate 79%, Methanol 21%, 200. | do | do | NaCl, 4 | 150 | 1–10. |
| Do | do | do | do | NaCl, 5 | 150 | 1–10. |
| Do | Methyl acetate 80.5%, Methanol 19.5%, 200. | do | do | NaCl, 4 | 150 | 1–5. |
| Do | do | do | do | NaCl, 5 | 150 | 2–15. |
| Do | Methyl acetate 82%; Methanol 18%, 200. | do | do | NaCl, 4 | 150 | 1–5. |
| Do | do | do | do | NaCl, 5 | 150 | 15–25. |
| Do | Methyl acetate 85%; Methanol 15%, 200. | do | do | NaCl, 4 | 150 | 3–10. |
| Do | do | do | do | NaCl, 5 | 150 | Up to 50. |

TABLE I—Continued

| Cellulose ester, grams | Solvent, ml. | Colloid, grams | Surface-active agent, grams | Salt, grams | Water, ml. | Particle size, microns |
|---|---|---|---|---|---|---|
| Cellulose acetate, 30 | Methyl acetate 86%; Methanol 14%, 200. | Methyl cellulose, 4,000 cps., 2.1. | Turkey red oil (75%), 1.6. | NaCl, 3 | 150 | 1–10. |
| Do | do | do | do | NaCl, 4 | 150 | 5–30. |
| Do | Methyl acetate 77%; Methanol 23%, 200. | Methyl cellulose, 4,000 cps., 1.2. | do | do | 150 | Platelets. |
| Do | Methyl acetate 78%; Methanol 22%, 200. | do | do | do | 150 | 2–15. |
| Do | do | do | do | NaCl, 5 | 150 | 2–15. |
| Do | Methyl acetate 79%; Methanol 21%, 200. | do | do | NaCl, 4 | 150 | 2–12. |
| Do | do | do | do | NaCl, 5 | 150 | 2–10. |
| Do | Methyl acetate 80%; Methanol 20%, 200. | do | do | NaCl, 4 | 150 | 1–15. |
| Do | do | do | do | NaCl, 5 | 150 | 2–10. |
| Do | Methyl acetate 81%; Methanol 19%, 200. | do | do | NaCl, 4 | 150 | 1–10. |
| Do | do | do | do | NaCl, 5 | 150 | 3–25. |
| Do | Methyl acetate 82%; Methanol 18%, 200. | do | do | NaCl, 4 | 150 | 1–10. |
| Do | Methyl acetate 83%; Methanol 17%, 200. | do | do | do | 150 | 2–20. |
| Do | do | do | do | NaCl, 5 | 150 | 5–25. |
| Do | Methyl acetate 80%; Ethanol 20%, 200. | Methyl cellulose, 4,000 cps., 4.2. | do | NaCl, 4 | 150 | 1–8, av. 5. |
| Do | Methyl acetate 85%; Ethanol 15%, 200. | do | do | do | 150 | 1–10, av. 5. |
| Do | do | Methyl cellulose, 4,000 cps., 2.1. | none | do | 150 | 2–15, av. 10. |
| Do | Methyl acetate 85%; Methanol 15%, 200. | do | do | do | 150 | 2–15, av. 10. |
| Do | do | do | Petronate L (Petroleum sulfonates), 1.5. | do | 150 | 2–10, av. 5. |
| Do | do | do | Petromix #9 (Petroleum sulfonates), 1.5. | do | 150 | 2–10, av. 4. |
| Do | do | Methyl cellulose, 4,000 cps., 1.5. | do | do | 150 | 1–15, av. 5. |
| Do | do | Methyl cellulose, 4,000 cps., 2.1. | Petromix #9 (Petroleum sulfonates), 0.75. | do | 150 | 2–15, av. 5. |
| Do | Methyl acetate 82%; Methanol 18%, 200. | Methyl cellulose, 4,000 cps. 0.6. | Turkey red oil, 1.6 | NH₄Cl, 3 | 150 | 5–60. |
| Do | do | do | do | NH₄Cl, 4 | 150 | 2–20. |
| Do | Methyl acetate 78%; Methanol 22%, 200. | Methyl cellulose, 1,500 cps., 4.2. | do | NaCl, 4 | 150 | 1–2. |
| Do | Methyl acetate 80%; Methanol 20%, 200. | do | do | do | 150 | 1–2. |
| Do | Methyl acetate 81%; Methanol 19%, 200. | do | do | do | 150 | 1–2. |
| Do | Methyl acetate 82%; Methanol 18%, 200. | do | do | do | 150 | 1–2. |
| Do | Methyl acetate 83%; Methanol 17%, 200. | do | do | do | 150 | 1–2. |
| Do | Methyl acetate 83.3%; Methanol 16.7%, 200. | do | do | do | 150 | 1–2. |
| Do | do | Methyl cellulose, 1,500 cps., 2.1. | do | do | 150 | 1–10. |
| Do | do | do | do | NaCl, 5 | 150 | 1–10, av. 5. |
| Do | do | do | do | none | 150 | irreg., 1,000. |
| Do | Methyl acetate 86%; Methanol 14%, 200. | Methyl cellulose, 1,500 cps., 4.2. | do | NaCl, 4 | 150 | 1–2. |
| Do | do | Methyl cellulose, 1,500 cps, 2.1. | do | NaCl, 5 | 150 | 1–15. |
| Do | do | Methyl cellulose, 1,500 cps., 4.2. | do | do | 150 | 1–2. |
| Do | Methyl acetate 90%; Methanol 10%, 200. | Methyl cellulose, 1,500 cps,. 5.2. | do | NaCl, 4 | 150 | 1–2. |
| Do | Methyl acetate 92%; Methanol 8%, 200. | Methyl cellulose, 1,500 cps,. 4.2. | do | do | 150 | 1–5. |
| Do | Ethyl acetate 85%; Ethanol 15%, 200. | Polyvinyl methyl ether-maleic anhydride, 2.0. | none | do | 150 | 2–80. |
| Do | do | Polyvinyl methyl ether-maleic anhydride, 3. | do | do | 150 | 2–10, av. 8. |
| Do | do | Polyvinyl methyl ether-maleic anhydride, 4. | do | do | 150 | 2–20, av. 10. |
| Do | do | Polyvinyl methyl ether-maleic anhydride, 3.0. | Polyethylene glycol, 1.0. | do | 150 | 2. |
| Do | do | Polyvinyl methyl ether-maleic anhydride, 1.5. | do | do | 150 | 2–12, av. 8. |
| Do | do | Polyvinyl methyl ether-maleic anhydride, 1.0. | Turkey red oil, 3 | do | 150 | 2–12, av. 8. |
| Do | do | Polyvinyl methyl ether-maleic anhydride, 6. | none | do | 150 | 10. |
| Do | do | Polyvinyl methyl ether-maleic anhydride, 3. | none | do | 150 | 2–10, av. 9. |
| Do | do | do | Turkey red oil, 1.0; polyethylene glycol, 1.0. | do | 150 | 1–4. |
| Do | do | do | Turkey red oil, 1.0 | do | 150 | 2–10, av. 5. |
| Do | do | do | Polyethylene glycol, 1.0. | do | 150 | 2. |
| Do | do | Polyvinyl methyl ether-maleic anhydride, 1. | Turkey red oil, 3.0 | do | 150 | 2–10. |
| Do | do | Polyvinyl methyl ether-maleic anhydride, 3. | Turkey red oil, 0.5; polyethylene glycol, 0.5. | do | 150 | 2. |
| Do | Chloroform 90%; Ethanol 10%, 200. | do | Turkey red oil, 1.6 | do | 150 | 2–40. |
| Do | Chloroform 85%; Ethanol 15%, 200. | do | do | do | 150 | 2–60. |
| Do | Chloroform 80%; Ethanol 20%, 200. | do | do | do | 150 | 2–30. |
| Do | do | do | none | do | 150 | 2–20, av. 10. |

TABLE I—Continued

| Cellulose ester, grams | Solvent, ml. | Colloid, grams | Surface-active agent, grams | Salt, grams | Water, ml. | Particle size, microns |
|---|---|---|---|---|---|---|
| Cellulose acetrte, 30 | Chloroform 85%; Ethanol 15%, 200. | Casein 4.0; NH$_4$OH, 1.0 | Turkey red oil, 1.6 | NaCl, 4 | 150 | 10–25, av. 15. |
| Do | ----do---- | Casein, 8.0 | Turkey red oil, 2 | ----do---- | 150 | 2–40. |
| Do | ----do---- | ----do---- | Sorbitan monostearate polyoxyalkylene deriv., 2.0. | ----do---- | 150 | 5–25. |
| Do | ----do---- | Casein, 4.0 | none | ----do---- | 150 | 5–70. |
| Do | ----do---- | Gum arabic, 10 | Turkey red oil, 1.6 | ----do---- | 150 | 2–40, av. 20. |
| Do | ----do---- | ----do---- | none | ----do---- | 150 | 2–40, av. 25. |
| Do | ----do---- | ----do---- | Polyethylene glycol of lauric acid, 3.0. | ----do---- | 150 | 2–40, av. 20. |
| Cellulose acetate propionate, 30. | Methyl acetate 82%; Methanol 18%, 200. | Methyl cellulose, 4,000 cps., 1.2. | Turkey red oil, 1.6 | ----do---- | 150 | up to 40. |
| Cellulose acetate butyrate, 30. | Methyl acetate 82%; Methanol 18%, 155. | Methyl cellulose, 4,000 cps., 2.1. | ----do---- | ----do---- | 150 | 1–20. |
| Cellulose acetate sorbate, 30. | Ethyl acetate 85%; Ethanol 15%, 200. | Polyvinyl methyl ether maleic anhydride, 4.0. | none | ----do---- | 150 | 10–30, av. 15. |
| Do | ----do---- | Polyvinyl methyl ether maleic anhydride, 6. | ----do---- | ----do---- | 150 | 1–10. |

The cellulose ester particles prepared according to our process are spherical and may be obtained in sizes as small as 1 micron or less in diameter. The particle size range is generally about 1 to 10 or 25 microns. This is the preferred size range. Depending upon the specific components and concentrations employed in the process, particle size may range up to about 100 microns. In general, products in which the average particle diameter is about 50 microns are marginal. In other words, it is preferable that the size distribution of the particles by number be such that the maximum average size is about 50 microns.

Density of the particles is high. In the case of cellulose acetate, the average is about 1.3 to 1.38 with a minimum of about 1.25. This compares very favorably with published figures of 1.27 to 1.35. The average density of cellulose acetate propionate spheres prepared according to our process ranges from about 1.195 to 1.29. In the case of cellulose acetate butyrate, the average density is about 1.193 to 1.197 as compared with published figures of 1.14 to 1.22 and a density of 0.546–0.647 for the raw material from which the spheres of our invention were prepared. The density of cellulose acetate sorbate averages about 1.3 and is the same as the published density of 1.3. Thus the densities of the spherical particles prepared according to our process clearly demonstrate the non-porosity of the particles.

The small, non-porous, spherical particles of the fatty acid esters of cellulose may be employed in the manufacture of plastic objects and materials in any desired manner. They are especially useful, however, in that they can be suspended in a plasticizer to form homogeneous, stable, fluid slurries which may be poured as coatings or films without requiring the addition of water or a volatile solvent and may be molded into objects of any desired shape and size without the application of high temperatures and pressures. Such fluid slurries are described and claimed in Sloan and Mann patent application filed concurrently herewith.

Although this invention has been described with reference to illustrative embodiments thereof, it will be apparent to those skilled in the art that it may be embodied in other forms but within the scope of the appended claims.

We claim:

1. Lower fatty acid esters of cellulose in the form of finely-divided material consisting essentially of solid, substantially spherical, substantially non-porous particles having a maximum diameter of about 100 microns, said particles being characterized by their ability to be dispersed in a plasticizer to form homogeneous fluid suspensions.

2. Lower fatty acid esters of cellulose in the form of finely-divided material consisting essentially of solid, substantially spherical, substantially non-porous particles having a maximum average diameter of about 50 microns and a maximum diameter of about 100 microns, said particles being characterized by their ability to be dispersed in a plasticizer to form homogeneous fluid suspensions.

3. Lower fatty acid esters of cellulose in the form of finely-divided material consisting essentially of solid, substantially spherical, substantially non-porous particles having a maximum diameter of about 25 microns, said particles being characterized by their ability to be dispersed in a plasticizer to form homogeneous fluid suspensions.

4. The produce of claim 1 in which the ester is cellulose acetate.

5. The product of claim 2 in which the ester is cellulose acetate.

6. The product of claim 3 in which the ester is cellulose acetate.

7. The product of claim 1 in which the ester is cellulose acetate sorbate.

8. The product of claim 1 in which the ester is cellulose acetate propionate.

9. The product of claim 1 in which the ester is cellulose acetate butyrate.

10. The product of claim 4 having a minimum density of about 1.25.

11. The product of claim 7 having a minimum density of about 1.3.

12. The product of claim 8 having a minimum density of about 1.19.

13. The product of claim 9 having a minimum density of about 1.19.

References Cited in the file of this patent

UNITED STATES PATENTS

| | | |
|---|---|---|
| 2,072,270 | Martin | Mar. 2, 1937 |
| 2,322,575 | Hill | June 22, 1943 |
| 2,339,631 | Fletcher et al. | Jan. 18, 1944 |
| 2,356,896 | Smith | Aug. 29, 1944 |
| 2,396,165 | Ernsberger | Mar. 5, 1946 |
| 2,439,111 | Tamblyn et al. | Apr. 6, 1948 |
| 2,596,656 | Crane | May 13, 1952 |
| 2,722,528 | Johnson | Nov. 1, 1955 |
| 2,740,723 | Voris | Apr. 3, 1956 |